May 29, 1956  E. P. CURRY  2,747,535
PNEUMATIC CLAMP

Filed Jan. 16, 1953  3 Sheets-Sheet 1

INVENTOR.
Elmer P. Curry
BY Chas. Denegre
Attorney

May 29, 1956 E. P. CURRY 2,747,535
PNEUMATIC CLAMP
Filed Jan. 16, 1953 3 Sheets-Sheet 2
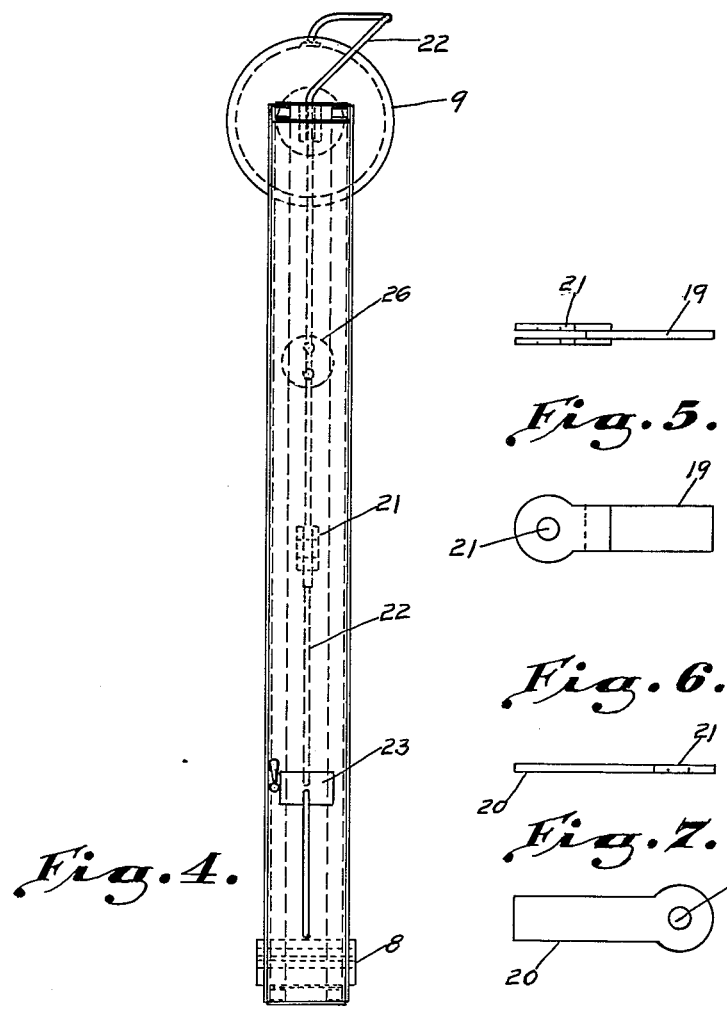
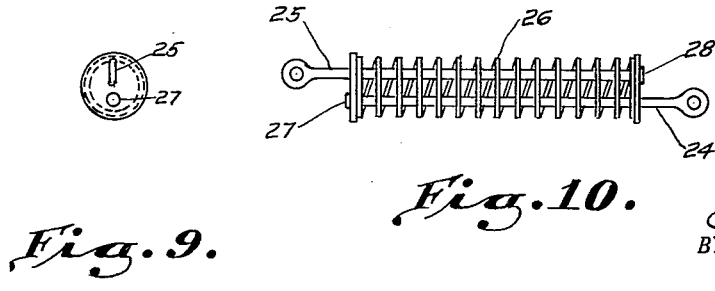
INVENTOR.
Elmer P. Curry
BY Chas. Denegre
Attorney.

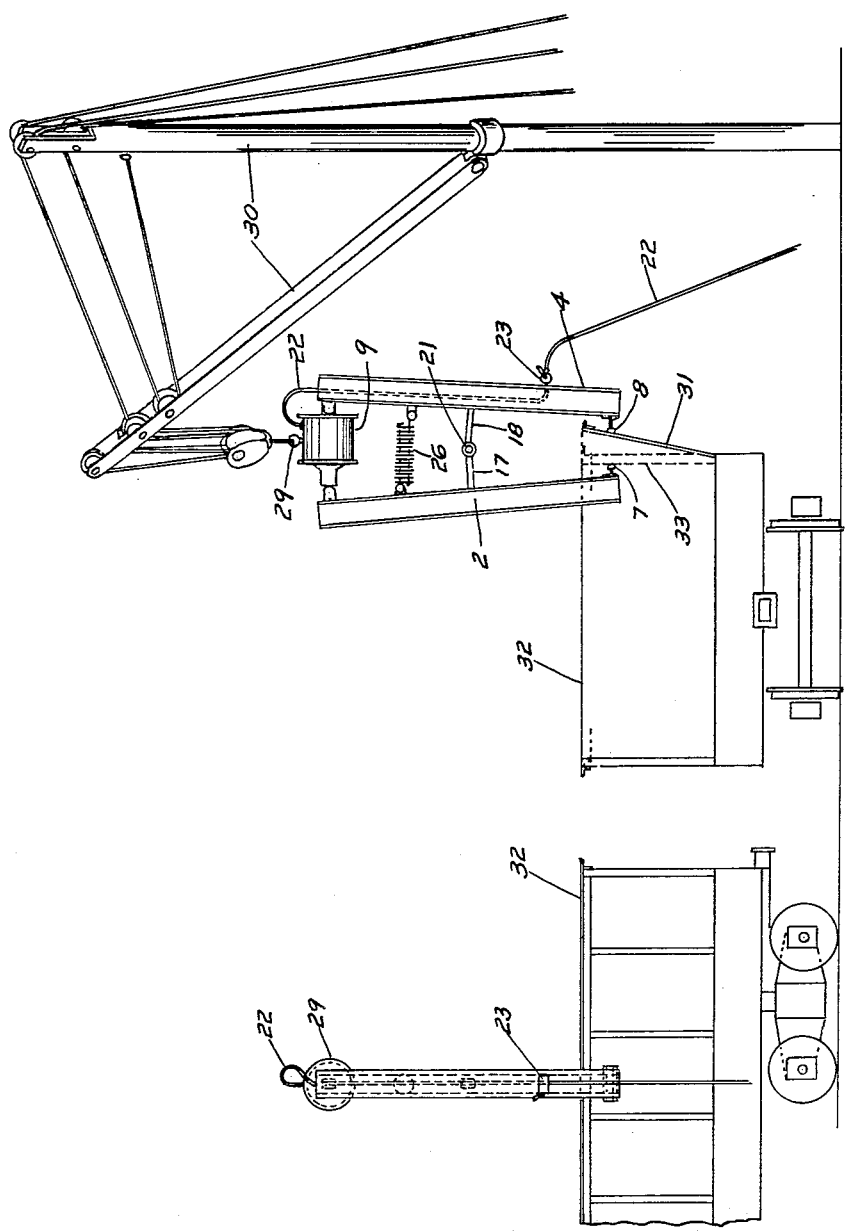

United States Patent Office 2,747,535
Patented May 29, 1956

2,747,535

PNEUMATIC CLAMP

Elmer P. Curry, Columbus, Ga.

Application January 16, 1953, Serial No. 331,716

2 Claims. (Cl. 113—99)

This invention relates to a pneumatic clamp especially intended for heavy duty work such as repairing open top railroad cars and the like.

Further objects are to provide such a device that will be highly satisfactory for its purpose, simple in structure, comparatively cheap to manufacture, easy to use, and extremely durable.

Other objects and advantages will appear from the drawings and specification.

Figure 1:
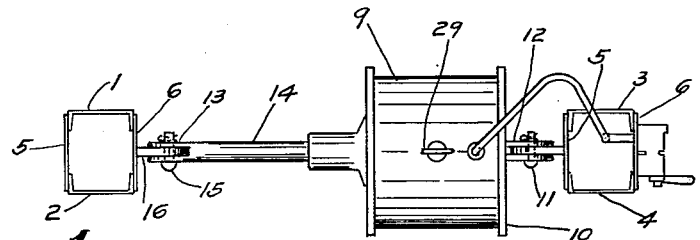
Figure 2:
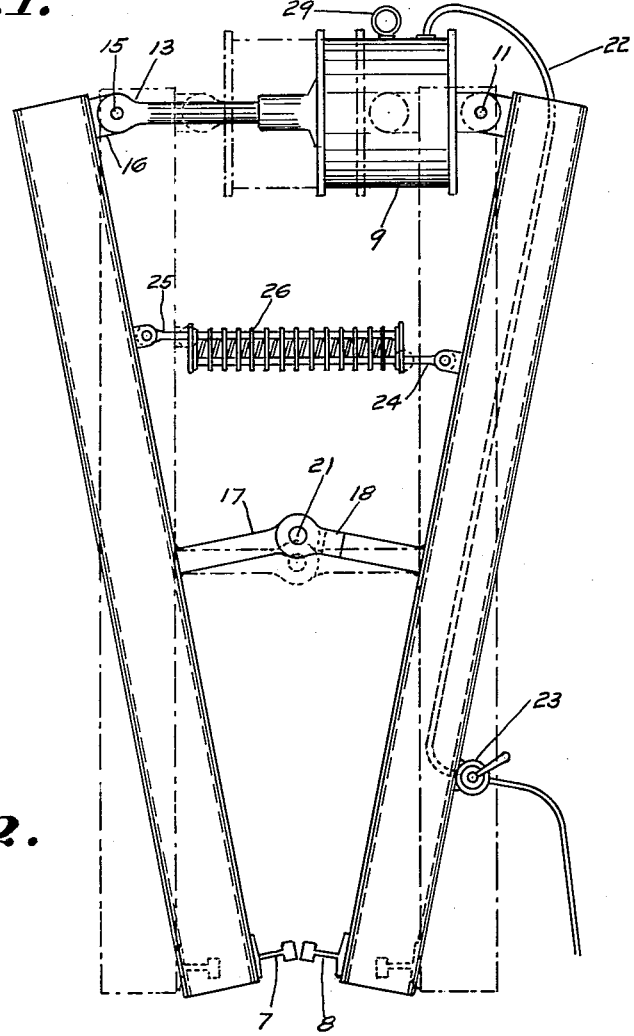
Figure 3:
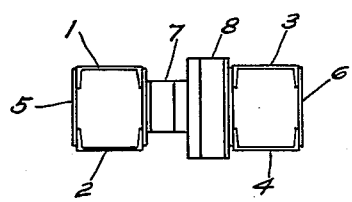

By referring generally to the drawings, a part of this application, it will be observed that Fig. 1 is a top view of Fig. 2; Fig. 2 is a side elevational view of the device made according to this invention showing the mechanism in full lines in its clamping position, and in broken lines in its open or non-clamping position; Fig. 3 is an end view of Fig. 2; Fig. 4 is an edge view of Fig. 2; Figs. 5, 6, 7, 8, 9 and 10 are detail views of parts of the device; Fig. 11 is a side view of part of a railroad car and the device; and Fig. 12 is an end view of a railroad car and the device in position for use, and part of a crane showing how the device is adapted for heavy duty repairs or any other work where it is necessary to clamp and hold parts together.

Similar reference numerals refer to similar parts throughout the several views.

Referring to the drawings in detail it will be seen that the clamping device comprises two main members consisting of channel metal pieces 1, 2, 3 and 4 welded to flat pieces 5 and 6. At the bottom ends of the main members, pieces of rails 7 and 8 are attached to act as clamping jaws. An air cylinder 9 is mounted at the top ends of the main members with the rear 10 of the cylinder supported on a shaft 11 and bearing 12 attached between the cylinder and main member with the outer end 13 of the piston rod 14 attached by shaft 15 and bearing 16 to the other main member. Attached to the inner center portion of the main members are arms 17 and 18 with their free ends 19 and 20 mounted on a shaft or pin 21. These arms act as a fulcrum between the main members when the cylinder is operated by compressed air from a source (not shown) through hose 22 under control of a three-way valve 23. Rods 24 and 25 are pivotally attached by an end of each to the main members with the other end of each rod attached within and to a coil spring 26 as at 27 and 28 with the spring set to draw the main members toward each other when air pressure is released through the three-way valve from the cylinder. An eye 29 is attached in the top of the cylinder for use by a crane 30 as shown in Fig. 12.

From the foregoing it will appear that the clamping device is highly suitable for repairing a damaged open top freight car as plainly shown in Fig. 12 wherein the side 31 of the car 32 is being forced toward its proper position in order to attach it by welding to the supporting bar 33 of the car. Thus it will appear that the device is perfectly suitable for heavy duty clamping work of any kind.

The various parts of the device may be made of any kind of metal suitable for the purpose. Also the parts may be made in different sizes and capacities depending on how and where to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

1. A pneumatically operable clamping device of the character described comprising, two main members consisting of channel and flat pieces of metal welded together, a piece of railroad rail attached to one end of each member to thus form a pair of clamping jaws, each member having an arm attached to its middle portion, the free end of each arm having a round hole therethrough, a pin through said holes connecting the arms to thus form a fulcrum, an air cylinder and piston therefor mounted between the other ends of said main members, said cylinder being pivotally attached at its closed end to the end of one main member, the free end of the piston rod having a round hole therethrough, said rod end being pivotally attached to the end of the opposite main member, a rod attached to each main member approximately midway between the said fulcrum arms and said cylinder, a coil spring, said rods positioned through said spring with one end of each rod attached to the spring ends opposite each other with the spring tension set to pull the main members toward each other; a hose with valve therein attached to said cylinder adapted to supply compressed air from an independent source into said cylinder to thus expand two ends of the main members away from each other and simultaneously contract the other ends of the main members having rail piece jaws thereon for clamping an object between the jaws; an eye-bolt attached in the wall of the cylinder and positioned for controlling by independent power means the movement of the entire assembled clamping device.

2. A heavy duty clamping device of the character described comprising, two identical elongated hollow main parts as levers, one end of each lever being designated as the clamping end, said ends having portions of a railway rail attached as jaws, a cylinder with piston rod pivotally attached between the other ends of the levers, a fulcrum pivotally attached between the levers and approximately midway between the jaw ends and the cylinder ends, a rod pivotally attached to each lever between the said fulcrum and the cylinder, a coil spring mounted around said rods with one end of each rod attached to the ends of the spring opposite each other with the tension of the spring disposed to pull said levers toward each other, a compressed air supply hose connected to said cylinder, a control valve attached in said hose, an eye-bolt attached in the wall of said cylinder, said cylinder with compressed air therein being adapted to separate two ends of the levers while the other ends of the levers move toward each other for clamping an object therebetween.

References Cited in the file of this patent

UNITED STATES PATENTS

| 1,060,477 | Meyers | Apr. 29 1913 |
| 2,021,893 | Mitchell | Nov. 26, 1935 |
| 2,176,664 | Burke | Oct. 17, 1939 |
| 2,269,754 | Bernhardt et al. | Jan. 13, 1942 |
| 2,389,526 | Maulding | Nov. 20, 1945 |
| 2,436,806 | Hunt | Mar. 2, 1948 |